United States Patent
Gouzenes et al.

(10) Patent No.: US 11,585,682 B2
(45) Date of Patent: Feb. 21, 2023

(54) METHOD FOR DETERMINING THE POSITION OF A MOTOR VEHICLE CRANKSHAFT

(71) Applicant: VITESCO TECHNOLOGIES GMBH, Hanover (DE)

(72) Inventors: Nora-Marie Gouzenes, Toulouse (FR); Stéphane Eloy, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 2 days.

(21) Appl. No.: 17/278,940

(22) PCT Filed: Sep. 24, 2019

(86) PCT No.: PCT/EP2019/075714
§ 371 (c)(1),
(2) Date: Mar. 23, 2021

(87) PCT Pub. No.: WO2020/064734
PCT Pub. Date: Apr. 2, 2020

(65) Prior Publication Data
US 2022/0034685 A1    Feb. 3, 2022

(30) Foreign Application Priority Data
Sep. 24, 2018 (FR) ...................... 1858622

(51) Int. Cl.
*G01D 5/244* (2006.01)
*G01M 15/04* (2006.01)

(52) U.S. Cl.
CPC ....... *G01D 5/24495* (2013.01); *G01D 5/2448* (2013.01); *G01M 15/046* (2013.01)

(58) Field of Classification Search
CPC ............ G01D 5/24495; G01D 5/2448; G01D 5/24457; G01M 15/046; G01M 15/06;
(Continued)

(56) References Cited

U.S. PATENT DOCUMENTS 4,066,968 A * 1/1978 Guipaud ............... F02P 5/1556
327/64
4,814,704 A * 3/1989 Zerrien, Jr. .......... F02P 7/0775
324/225

(Continued)

FOREIGN PATENT DOCUMENTS

CN      1539055 A     10/2004
CN    101265851 A      9/2008
(Continued)

OTHER PUBLICATIONS

International Search Report and Written Opinion of the ISA for PCT/EP2019/075714 dated Nov. 25, 2019, 12 pages.
(Continued)

*Primary Examiner* — Catherine T. Rastovski
*Assistant Examiner* — Kaleria Knox
(74) *Attorney, Agent, or Firm* — Nixon & Vanderhye

(57) ABSTRACT

A method for determining the position of a motor-vehicle crankshaft with a rotating target wheel including markers distributed uniformly over its periphery and a signature, and a sensor sending an electrical signal with edges that appear during the passage of a marker or of the signature before the sensor, including: determining detection time of an edge; determining detection time and computing time difference between estimation and determination; determining angular error; determining presence of an abnormal edge when the angular error exceeds a threshold and storing the associated marker number in a first error list; when the signature passes, copying the first error list to the second if it does not exist; adjusting an occurrence counter depending on the error list;

(Continued)

and if the errors are not transient, correcting edges with marker numbers in memory in the second error list, then sending a crankshaft position signal depending on the signal.

16 Claims, 3 Drawing Sheets

(58) Field of Classification Search
CPC ....... G01P 3/489; F02P 7/0775; F02P 5/1556; B65H 29/16; F02D 41/0097; F01D 35/028
See application file for complete search history.

(56) References Cited

U.S. PATENT DOCUMENTS

| | | | |
|---|---|---|---|
| 6,840,236 | B2 | 1/2005 | Takahashi et al. |
| 7,397,393 | B2 | 7/2008 | Yamamoto |
| 7,607,415 | B2 | 10/2009 | Mathews et al. |
| 7,827,857 | B2 | 11/2010 | Serra et al. |
| 7,899,607 | B2 | 3/2011 | Shin et al. |
| 8,028,568 | B2 | 10/2011 | Serra et al. |
| 9,194,321 | B1 | 11/2015 | Porlick et al. |
| 9,689,329 | B2 | 6/2017 | Remele et al. |
| 11,084,680 | B1* | 8/2021 | Widener ................ B65H 29/16 |
| 2003/0168044 | A1* | 9/2003 | Rupp .................... G01M 15/06 73/114.26 |
| 2006/0042074 | A1 | 3/2006 | Stork et al. |
| 2009/0326860 | A1* | 12/2009 | Hainz ..................... G01P 3/489 702/163 |
| 2015/0346004 | A1 | 12/2015 | Mirassou et al. |
| 2018/0172480 | A1* | 6/2018 | Courtel ................. G01D 5/2451 |
| 2022/0003177 | A1* | 1/2022 | Joseph .................... F01L 1/047 |

FOREIGN PATENT DOCUMENTS

| | | | | |
|---|---|---|---|---|
| CN | 101408140 | A | 4/2009 | |
| CN | 101878360 | A | 11/2010 | |
| CN | 102667413 | A | 9/2012 | |
| CN | 104838118 | A | 8/2015 | |
| CN | 105386918 | A | 3/2016 | |
| CN | 105492871 | A | 4/2016 | |
| CN | 109983309 | A * | 7/2019 | ......... G01D 5/24457 |
| DE | 42 27 113 | A1 | 2/1994 | |
| DE | 10 2007 004 358 | A1 | 7/2007 | |
| EP | 2136061 | A1 * | 12/2009 | ........... F02D 35/028 |
| EP | 2518451 | A1 * | 10/2012 | ......... F02D 41/0097 |
| EP | 2 518 451 | B1 | 9/2015 | |
| EP | 3 040 690 | B1 | 3/2021 | |
| JP | 2005061371 | A * | 3/2005 | |
| JP | 2007-155627 | A | 6/2007 | |
| JP | 2013-200268 | A | 10/2013 | |
| KR | 2002-0095644 | | 12/2002 | |

OTHER PUBLICATIONS

Office Action issued in Chinese Patent Application No. 201980062232.0 dated Jul. 28, 2022.

Notification to Grant Patent Right for Invention issued in Chinese Patent Application No. 201980062232.0 dated Sep. 23, 2022.

Dong et al., "Automatic detection system of fault code for small size absolute photoelectric encoder," Chinese Optics, vol. 9, No. 6, Dec. 2016, pp. 695-703.

* cited by examiner

METHOD FOR DETERMINING THE POSITION OF A MOTOR VEHICLE CRANKSHAFT

This application is the U.S. national phase of International Application No. PCT/EP2019/075714 filed Sep. 24, 2019 which designated the U.S. and claims priority to FR Patent Application No. 1858622 filed Sep. 24, 2018, the entire contents of each of which are hereby incorporated by reference.

BACKGROUND OF THE INVENTION

Field of the Invention

The technical field of the invention is that of methods for controlling internal combustion engines, and more particularly, such methods that are able to correct phasing.

Description of the Related Art

The combustion cycle of an internal combustion engine comprises a plurality of phases, the occurrence of which in each cylinder is shifted in time. In order for the combustion cycle to proceed normally, it is necessary to have a reliable time reference, on the basis of which each phase of each cylinder is determined.

Such a reference is obtained via a crankshaft sensor associated with a rotating target wheel equipped with markers distributed over its periphery. A marker is generally magnetic and either takes the form of a tooth, or is embedded in the bulk of the target wheel. The role of the crankshaft sensor is to determine an electrical signal depending on the passage of the markers. Most often, it is mounted near the engine flywheel, which serves as a rotating target wheel or bears such a target wheel.

The rotation of the rotating target wheel causes periodic modifications in magnetic flux, which modifications are due to the passage of the markers, these modifications being converted by the sensor into voltage variations that are then sent to the engine management computer. The voltage variations comprise rising edges and falling edges forming a periodic signal that is synchronized with the passage of the markers in front of the sensor. A rising edge appears on each passage of a marker in front of the sensor and is considered in the remainder of the description to be the edge in question. From the voltage variations and the succession of edges, the speed of rotation and the angular position of the crankshaft are computed with a view to obtaining the basic data required to determine injection timing and to adjust ignition timing advance.

The rotating target wheel possesses a signature, also called a gap or long tooth, that usually corresponds to two missing markers, and that allows a reference crankshaft position to be defined. Such a signature generates a different signal from the other markers, allowing it to be determined when the rotating target wheel has made a complete rotation.

A commonly employed rotating target wheel comprises 60 markers distributed over the periphery of the rotating target wheel, and two consecutive removed markers to create the signature. Such a target wheel is called a 60-2 rotating target wheel.

When a 60-2 rotating target wheel is used, the sensor receives a signal every 6° (6°=360°/60 markers). On each received edge, the position of the engine has increased by 6°. Between the markers, the position of the engine is predicted using the instantaneous speed and the speed gradient, which is determined at the same position as for the previous cylinder.

In the case of noise or of interference affecting the sensor signal, additional edges or missing edges may be detected, leading it to be believed that there are, compared to the markers expected, additional or missing markers, respectively. Additional edges may be created by iron filings becoming concentrated in the recesses of the markers. Missing edges may be detected in case of impacts on the target wheel.

These additional or missing edges disrupt the computation of the position of the engine, and thus generate inaccuracy in this determination. The parameters used for combustion are then no longer sequenced optimally and may generate pollution.

When too many missing or additional edges are detected, the computation of the position of the engine passes to a degraded mode. In this case, edges generated by from a target wheel of the camshaft are used to recompute the position of the engine. The latter target wheel is less precise as it has fewer markers than a crankshaft rotating target wheel.

There is therefore a problem with late detection of additional or missing edges.

SUMMARY OF THE INVENTION

One objective of the present invention is to detect additional or missing edges more rapidly, in particular in order to delay as much as possible potential passage of the engine control to degraded mode.

There is also a problem related to the fact that it is impossible to detect the simultaneous presence of a missing edge and of an additional edge. However, such a situation distorts the determination of the position of the crankshaft between two erroneous edges.

The subject of the invention is a method for determining the position of a motor-vehicle crankshaft equipped with a rotating target wheel comprising markers distributed uniformly over its periphery and a signature, and a sensor configured to send an electrical signal comprising a succession of edges that appear during the passage of a marker or of the signature in front of the sensor. The method comprises the following steps:

on each edge of the rotating target wheel up to the edge corresponding to the signature, the time of detection of an edge is determined then the time of detection of the next edge is estimated depending on the speed of rotation of the crankshaft and the history of the previous edges, the time of detection of the next edge is determined then the time difference between the estimation of the time of detection of the next edge and the determination of the time of detection of the next edge is computed, an angular error is determined depending on the determination of the time of detection of the next edge and on the time difference, if it is determined that the absolute value of the angular error is higher than a threshold, the presence of an abnormal edge is determined and the associated marker number is stored in memory in a first error list, on the passage of the edge corresponding to the signature, if a second error list does not exist, the first error list is copied to a second error list, at least one counter of occurrences is adjusted depending on the first error list and on the second error list, and it is determined whether the at least one edge the associated marker number of which is stored in memory in the second error list is not due to a transient error depending on the at least one counter of occurrences, if such is the case, the at least one edge the associated marker number of which corresponds to a marker number from the second error list is corrected, then the at least one marker number associated with the corrected edge of the second error list and the at least one counter of occurrences are reset and a crankshaft-position signal is sent depending on the signal comprising the corrected edges.

To adjust the counter of occurrences, the following steps may be carried out:

the first error list is compared to the second error list, if the lists correspond, a counter of occurrences of the first error list is incremented by a first value, then the first error list is reset, if the lists do not correspond, the first error list and the second error list are reset and the counter of occurrences of the first error list is decremented by a second value.

It may be determined that the edges the marker numbers of which are stored in memory in the second error list are not due to transient errors, if the counter of occurrences of the first error list is higher than a preset threshold.

To adjust the at least one counter of occurrences, the following steps may be carried out:

the marker numbers of the first error list are compared to the marker numbers contained in the second error list, for each marker number present in the first error list and in the second error list, a counter of occurrences of a marker number in the first error list, which marker number is associated with said edge, is incremented by a first value, then and the at least one error is considered not to be transient, for each marker number not present in the first error list and in the second error list, the marker number of the second error list is reset, and the counter of occurrences of a marker number in the first error list, which marker number is associated with said edge, is decremented by a second value and the errors are considered to be transient, then the first error list is reset.

To determine whether at least one edge the marker number of which is stored in memory in the second error list is not due to a transient error, it may be determined whether at least one counter of occurrences of a marker number in the first error list, which marker number is associated with said edge, is higher than a preset threshold.

When the presence of an abnormal edge is determined, the sign of the time difference may be determined and the marker number corresponding to the last edge received, and additional marker information if the time difference is positive or missing marker information if the time difference is negative, may be stored in memory in a first error list.

To correct an edge the marker number of which is stored in memory in the second error list, on the next occurrence of the edge to be corrected, the edge is deleted if the corresponding marker number is associated with additional edge information, or an edge is added on the occurrence of the estimation of the time of a new edge corresponding to the marker number stored in memory if the marker number is associated with missing edge information.

BRIEF DESCRIPTION OF THE DRAWINGS

Other aims, features and advantages of the invention will become apparent on reading the following description, which is given solely by way of nonlimiting example, and with reference to the appended drawings, in which.

DESCRIPTION OF THE PREFERRED EMBODIMENTS

Figure 1:
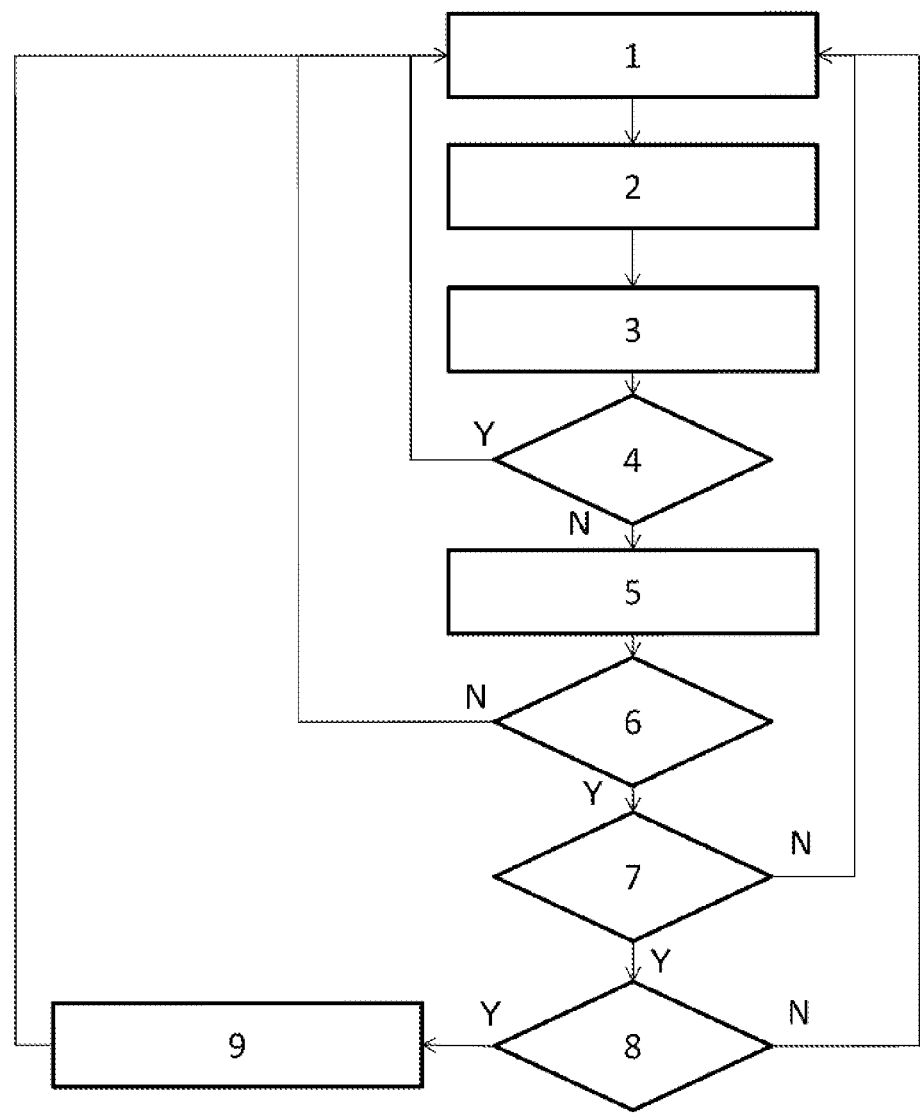
FIG. 1 illustrates the main steps of the control method according to the invention.

The invention is based on the comparison of a predicted time of occurrence of an edge with the time of occurrence of the crankshaft edge, which time is determined depending on the signal received from the sensor.

The method is initialized by storing in memory, for each value or list of values stored in memory that feature(s) in the steps below, a value of zero.

In a first step 1, the time Tn-1 at which an edge is detected is determined then the estimation of the time of detection of the next edge Tn_estimated is computed depending on the speed of rotation of the crankshaft and on the history of previous edges.

In a second step 2, the time Tn at which the next edge is detected is determined then the time difference ΔT between the estimation Tn_estimated of the time of detection of the next edge and the time Tn at which the next edge is detected is computed.

In a third step 3, the time difference ΔT is converted into an angular error Err° depending on the time Tn at which the next edge is detected and on the corresponding angular deviation Δ° marker in a coordinate system of the rotating target wheel by applying the following equation:

$$\text{Err}° = \Delta°_{marker} * \Delta T / T_n \quad \text{(Eq. 1)}$$

It will be noted that $\Delta°_{marker}$ is equal to 6° for a target wheel with 60 markers and to 10° for a target wheel with 36 markers.

In a fourth step 4, it is determined whether the absolute value of the angular error Err° is lower than a threshold, 4° for example. An absolute value of the angular error Err° lower than the threshold is considered to be consistent with an acceleration or a deceleration in the speed of rotation of the crankshaft. A higher value is considered to be abnormal and due to the appearance of an additional edge or to the disappearance of an expected edge.

When the absolute value of the angular error Err° is lower than a threshold, the method returns to step 1.

When such is not the case, the method continues with a fifth step 5, in which the sign of the time difference ΔT is determined and the marker number corresponding to the last edge determined, and additional marker information if the time difference ΔT is positive or missing marker information if the time difference ΔT is negative, are stored in memory in a first error list NrFrontErr1.

The method then continues with a sixth step 6, in which it is determined whether passage of the edge corresponding to the signature has been detected.

If such is not the case, the method returns to the first step 1. If such is the case, the method continues with a seventh step 7. Steps 1 to 6 are thus repeated for each crankshaft edge of the rotating target wheel.

In the seventh step 7, it is determined whether there has been at least one marker number stored in memory in the first error list NrFrontErr1 since the previous passage of the signature.

To do this, it is determined whether at least one value of the first error list is non-zero.

If such is not the case, the method returns to step 1.

If such is the case, the presence of an error is confirmed, then the values of the first error list NrFrontErr1 are compared to the values contained in the second error list NrFrontErr2, if it exists.

In a first embodiment, if the second error list NrFrontErr2 does not exist, the first error list NrFrontErr1 is copied to the second error list NrFrontErr2.

The first error list NrFrontErr1 and the second error list NrFrontErr2 in their entireties are compared.

If the lists correspond, a counter of occurrences NrRevMem of the first error list NrFrontErr1 is incremented by a first value, then the first error list NrFrontErr1 is reset. The counter of occurrences of the first error list corresponds to a counter of the number of times the first error list NrFrontErr1 corresponds to the second error list NrFrontErr2.

If the lists do not correspond, the first error list NrFrontErr1 and the second error list NrFrontErr2 are reset and the counter of occurrences NrRevMem of the first error list NrFrontErr1 is decremented by a predefined second value.

The method continues with an eighth step 8, in which it is determined whether the counter of occurrences NrRevMem of the first error list NrFrontErr1 is higher than a preset threshold.

If such is not the case, the edges stored in memory in the first error list NrFrontErr1 are for the moment considered to be due to transient errors. The method returns to the first step 1.

If such is the case, the method continues with the ninth step 9, in which it is determined that the edges stored in memory in the error list are not transient and must be corrected. On the next occurrence of the edge corresponding to a marker the number of which is stored in memory in the second error list NrFrontErr2, the position of the edge associated with each marker number stored in memory is corrected. If the marker number is associated with additional edge information, the corresponding edge is deleted. If the marker number is associated with missing edge information, an edge is added on the occurrence of the estimation of the time Tn_estimated of a new edge corresponding to the marker number stored in memory.

The second error list NrFrontErr2 and the counter of occurrences NrRevMem of the first error list are reset. The method then returns to step 1.

The steps described above are repeated on each revolution of the rotating target wheel.

In a second embodiment, it is sought to compare the marker numbers in each of the error lists rather than the error lists in their entireties.

If the second error list NrFrontErr2 does not exist, the marker numbers of the first error list NrFrontErr1 are copied to the second error list NrFrontErr2.

The marker numbers of the first error list NrFrontErr1 and the marker numbers of the second error list NrFrontErr2 are compared.

For each marker number of the first error list NrFrontErr1, it is determined whether said marker number is present in the second error list NrFrontErr2.

If such is the case, a counter of occurrences NrFrontRevMem of a marker number associated with said edge is incremented by a first preset value.

If such is not the case, a counter of occurrences NrFrontRevMem of a marker number associated with said edge is decremented by a second preset value, then the marker number is deleted from the second error list NrFrontErr2. The counter of occurrences NrFrontRevMem of a marker number corresponds to a counter of the number of times the marker number in the first error list NrFrontErr1 was present or stored in memory in the second error list NrFrontErr2.

Once all the marker numbers in the first error list NrFrontErr1 have been compared to those in the second error list NrFrontErr2, the first error list NrFrontErr1 is reset.

The method continues with an eighth step 8, in which it is determined, for each marker number, whether the counter of occurrences NrFrontRevMem of a corresponding marker number is higher than a preset threshold.

If no counter of occurrences NrFrontRevMem of a marker number is higher than the preset threshold, the error related to an edge the corresponding marker number of which is stored in memory in the first list is for the moment considered to be transient. The method returns to the first step 1.

If at least one counter of occurrences NrFrontRevMem of a marker number is higher than the preset threshold, the method continues with the ninth step 9, in which it is determined that errors stored in memory for edges the corresponding marker number of which is stored in memory in the first list and for which the counter of occurrences NrFrontRevMem of a marker number is higher than the preset threshold, are not transient and must be corrected. On the next occurrence of an edge corresponding to a marker the number of which is stored in memory in the second error list NrFrontErr2 and for which the counter of occurrences NrFrontRevMem of a marker number is higher than the preset threshold, the position of the edge associated with each marker number stored in memory is corrected. If the marker number is associated with additional edge information, the corresponding edge is deleted. If the marker number is associated with missing edge information, an edge is added on the occurrence of the estimation of the time Tn_estimated of a new edge corresponding to the marker number stored in memory.

The second error list NrFrontErr2 and each counter of occurrences NrFrontRevMem of a marker number are reset. The method then returns to step 1.

Figure 2:
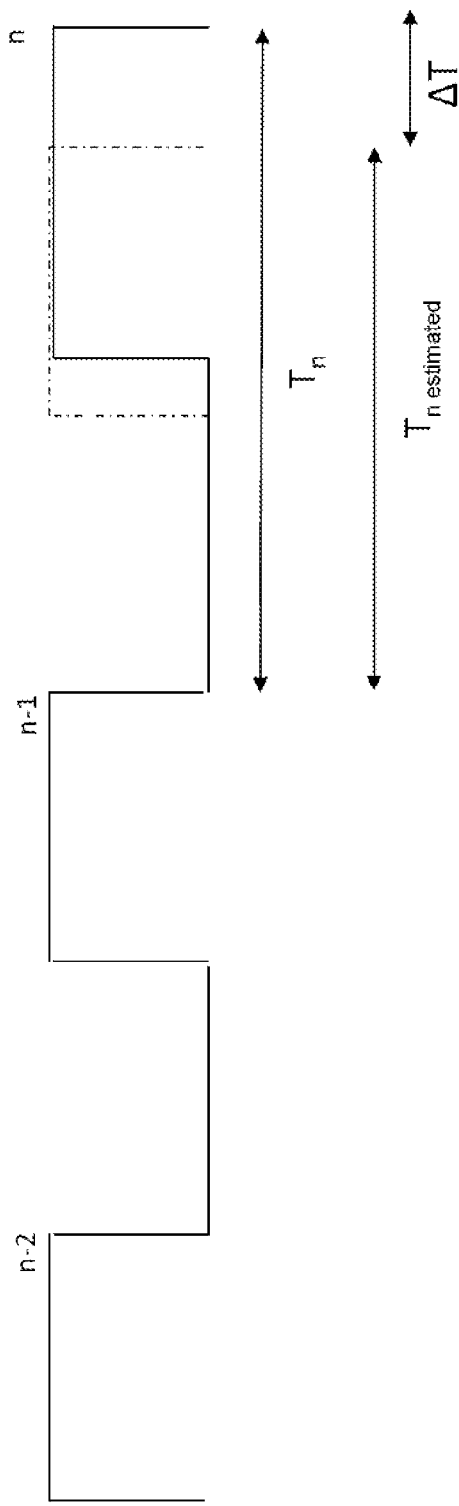
FIG. 2 illustrates the edges estimated and determined for a normal passage of a marker of the rotating target wheel.
Figure 3:
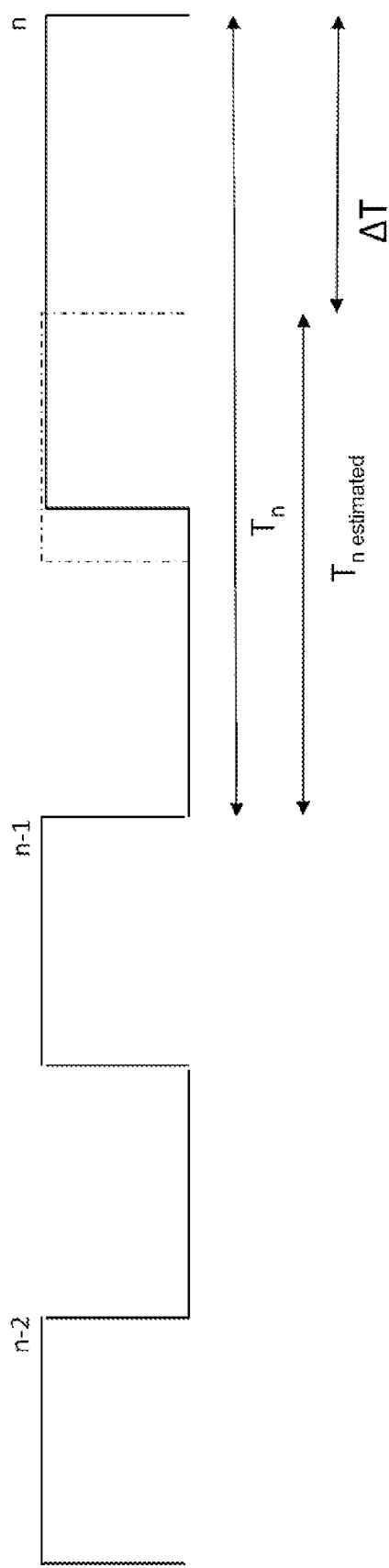
FIG. 3 illustrates the edges estimated and determined for an abnormal passage of a marker of the rotating target wheel characteristic of an additional marker.

FIGS. 2 and 3 illustrate the succession of edges generated by the passage of the markers of the rotating target wheel in front of the sensor. These figures also illustrate the result of the determinations of steps 1 to 4. The estimated time Tn_estimated of passage of the edge corresponding to the marker n, the time Tn of passage of the edge corresponding to the marker n and the time difference ΔT may all be seen. FIG. 2 in particular illustrates the case of a time difference ΔT below the threshold, corresponding to an edge considered normal.

FIG. 3 illustrates the case of a time difference ΔT that is above the threshold and positive, corresponding to an additional edge.

The invention claimed is:

1. A method for determining a position of a motor-vehicle crankshaft equipped with a rotating target wheel including markers distributed uniformly over a periphery of the target wheel and a signature, the motor-vehicle crankshaft including a sensor configured to send an electrical signal including a succession of edges that appear during passage of one of the markers or the signature in front of the sensor, the method comprising:

on each of the edges of the rotating target wheel up to the edge corresponding to the signature, determining a time of detection of the respective edge and then estimating a time of detection of a next one of the edges depending on a speed of rotation of the motor-vehicle crankshaft and a history of previous one of the edges, determining a time of detection of the next edge then computing a time difference between the estimated time of detection of the next edge and the determined time of detection of the next edge, determining an angular error depending on the determined time of detection of the next edge and the determined time difference, and when it is determined that the absolute value of the angular error is higher than a threshold, determining a presence of an abnormal edge and storing a marker number associated with the abnormal edge in memory in a first error list; and during the passage of the edge corresponding to the signature, when a second error list does not exist, copying the first error list to create the second error list, adjusting at least one counter of occurrences depending on whether the first error list and the second error list correspond with one another, determining whether the at least one edge the associated marker number of which is stored in the memory in the second error list is not due to a transient error depending on the at least one counter of occurrences being higher than a preset threshold, and when the at least one counter of occurrences is higher than the preset threshold, correcting the at least one respective edge the associated marker number of which corresponds to one of the marker numbers from the second error list then resetting the at least one marker number associated with the at least one corrected edge of the second error list and the at least one counter of occurrences and sending a crankshaft-position signal depending on a signal comprising the at least one corrected edge.

2. The determining method as claimed in claim 1, wherein, the adjusting the at least one counter of occurrences comprises:

comparing the first error list to the second error list, when the first and second error lists correspond, incrementing a counter of occurrences of the first error list by a first value, and then resetting the first error list, and when the first and second error lists do not correspond, resetting the first error list and the second error list and decrementing the counter of occurrences of the first error list by a second value.

3. The determining method as claimed in claim 2, wherein, when the presence of the abnormal edge is determined, determining a sign of the time difference, and storing, in the memory in the first error list, the determined sign of the time difference, the marker number corresponding to the last edge received, and (i) additional marker information when the time difference is positive or (ii) missing marker information when the time difference is negative.

4. The determining method as claimed in claim 3, wherein, to correct the respective edge the associated marker number of which is stored in memory in the second error list, on a next occurrence of the edge to be corrected, the edge to be corrected is deleted when the corresponding marker number is associated with additional edge information, or a new edge is added when the time of the new edge corresponding to the marker number stored in memory is estimated when the corresponding marker number is associated with missing edge information.

5. The determining method as claimed in claim 2, wherein, to correct the respective edge the associated marker number of which is stored in memory in the second error list, on a next occurrence of the edge to be corrected, the edge to be corrected is deleted when the corresponding marker number is associated with additional edge information, or a new edge is added when the time of the new edge corresponding to the marker number stored in memory is estimated when the corresponding marker number is associated with missing edge information.

6. The determining method as claimed in claim 1, wherein, the adjusting the at least one counter of occurrences comprises:

comparing the marker numbers of the first error list to the marker numbers contained in the second error list, for each of the marker numbers present in the first error list and the second error list, incrementing a counter of occurrences of the respective marker number in the first error list by a first value, the respective marker number in the first error list being associated with said respective edge, and the errors are considered not to be transient, for each of the marker numbers that are not present in the first error list and the second error list, resetting the marker number of the second error list, and decrementing the counter of occurrences of the respective marker number in the first error list by a second value, the respective marker number being associated with said respective edge, and the errors are considered to be transient, and then resetting the first error list.

7. The determining method as claimed in claim 6, wherein, the determining whether the storage in the memory of the associated marker number of the respective edge in the second error list is not due to the transient error comprises determining whether at least one counter of occurrences of a marker number, that is associated with the respective edge, in the first error list, is higher than a preset threshold.

8. The determining method as claimed in claim 7, wherein, when the presence of the abnormal edge is determined, determining a sign of the time difference, and storing, in the memory in the first error list, the determined sign of the time difference, the marker number corresponding to the last edge received, and (i) additional marker information when the time difference is positive or (ii) missing marker information when the time difference is negative.

9. The determining method as claimed in claim 8, wherein, to correct the respective edge the associated marker number of which is stored in memory in the second error list, on a next occurrence of the edge to be corrected, the edge to be corrected is deleted when the corresponding marker number is associated with additional edge information, or a new edge is added when the time of the new edge corresponding to the marker number stored in memory is estimated when the corresponding marker number is associated with missing edge information.

10. The determining method as claimed in claim 7, wherein, to correct the respective edge the associated marker number of which is stored in memory in the second error list, on a next occurrence of the edge to be corrected, the edge to be corrected is deleted when the corresponding marker number is associated with additional edge information, or a new edge is added when the time of the new edge corresponding to the marker number stored in memory is estimated when the corresponding marker number is associated with missing edge information.

11. The determining method as claimed in claim 6, wherein, when the presence of the abnormal edge is determined,
   determining a sign of the time difference, and
   storing, in the memory in the first error list, the determined sign of the time difference, the marker number corresponding to the last edge received, and (i) additional marker information when the time difference is positive or (ii) missing marker information when the time difference is negative.

12. The determining method as claimed in claim 11, wherein, to correct the respective edge the associated marker number of which is stored in memory in the second error list, on a next occurrence of the edge to be corrected, the edge to be corrected is deleted when the corresponding marker number is associated with additional edge information, or a new edge is added when the time of the new edge corresponding to the marker number stored in memory is estimated when the corresponding marker number is associated with missing edge information.

13. The determining method as claimed in claim 6, wherein, to correct the respective edge the associated marker number of which is stored in memory in the second error list, on a next occurrence of the edge to be corrected, the edge to be corrected is deleted when the corresponding marker number is associated with additional edge information, or a new edge is added when the time of the new edge corresponding to the marker number stored in memory is estimated when the corresponding marker number is associated with missing edge information.

14. The determining method as claimed in claim 1, wherein, when the presence of the abnormal edge is determined,
   determining a sign of the time difference, and
   storing, in the memory in the first error list, the determined sign of the time difference, the marker number corresponding to the last edge received, and (i) additional marker information when the time difference is positive or (ii) missing marker information when the time difference is negative.

15. The determining method as claimed in claim 14, wherein, to correct the respective edge the associated marker number of which is stored in memory in the second error list, on a next occurrence of the edge to be corrected, the edge to be corrected is deleted when the corresponding marker number is associated with additional edge information, or a new edge is added when the time of the new edge corresponding to the marker number stored in memory is estimated when the corresponding marker number is associated with missing edge information.

16. The determining method as claimed in claim 1, wherein, to correct the respective edge the associated marker number of which is stored in memory in the second error list, on a next occurrence of the edge to be corrected, the edge to be corrected is deleted when the corresponding marker number is associated with additional edge information, or a new edge is added on when the time of the new edge corresponding to the marker number stored in memory is estimated when the corresponding marker number is associated with missing edge information.

* * * * *